United States Patent
Zhang et al.

(10) Patent No.: US 7,637,171 B2
(45) Date of Patent: Dec. 29, 2009

(54) ULTRASONIC FLOW SENSOR WITH QUADRATURE DEMODULATION

(75) Inventors: Jiawei Zhang, Stuttgart (DE); Bernhard Opitz, Leonberg (DE); Michael Horstbrink, Stuttgart-Feuerbach (DE); Tobias Lang, Stuttgart (DE); Axel Wenzler, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 121 days.

(21) Appl. No.: 12/042,369

(22) Filed: Mar. 5, 2008

(65) Prior Publication Data

US 2008/0307895 A1 Dec. 18, 2008

(30) Foreign Application Priority Data

Jun. 13, 2007 (DE) .................... 10 2007 027 188

(51) Int. Cl.
*G01F 1/66* (2006.01)
(52) U.S. Cl. .................................. 73/861.26
(58) Field of Classification Search ........... 73/861.27, 73/861.25; 600/443
See application file for complete search history.

(56) References Cited

U.S. PATENT DOCUMENTS

| 4,155,259 | A | * | 5/1979 | Engeler ................. 73/626 |
| 4,324,258 | A | * | 4/1982 | Huebscher et al. ...... 600/455 |
| 6,514,205 | B1 | * | 2/2003 | Lee et al. ............... 600/443 |

* cited by examiner

*Primary Examiner*—Jewel Thompson
(74) *Attorney, Agent, or Firm*—Michael J. Striker

(57) ABSTRACT

An ultrasonic flow sensor, in particular for determining the flow velocity of a medium flowing through a pipeline, has at least one ultrasonic converter for transmitting and/or receiving ultrasonic signals, an oscillator, which is connected with the ultrasonic converter, and an evaluation unit, which determines a phase shift of the ultrasonic signal that was received, with respect to a reference signal. The evaluation unit includes a plurality of quadrature demodulators, which operate with different demodulation frequencies and each determine phase information about the ultrasonic signal that was received, and when a vernier unit is provided, which determines—based on the individual pieces of phase information—a phase angle or a quantity proportional thereto.

11 Claims, 6 Drawing Sheets

ULTRASONIC FLOW SENSOR WITH QUADRATURE DEMODULATION

CROSS-REFERENCE TO A RELATED APPLICATION

The invention described and claimed hereinbelow is also described in German Patent Application DE 10 2007 027188.5 filed on Jun. 16, 2007. This German Patent Application, whose subject matter is incorporated here by reference, provides the basis for a claim of priority of invention under 35 U.S.C. 119(a)-(d).

BACKGROUND OF THE INVENTION

The present invention relates to an ultrasonic flow sensor for determining the transit time of an ultrasonic signal, and to a related method.

Ultrasonic flow sensors are used, in particular, to measure the volumetric flow, mass flow, or the flow velocity of a gaseous or liquid medium flowing through a pipeline or the like. A known type of ultrasonic flow sensor includes two ultrasonic converters located such that they are offset in the direction of flow, each of which generates ultrasonic signals and transmits them to the other ultrasonic converter. The ultrasonic signals are received by the other converter and are evaluated electronically. The difference between the transit time of the signal in the direction of flow and the transit time of the signal in the opposite direction is a measure of the flow velocity of the fluid.

FIG. 1 shows a typical design of an ultrasonic flow sensor with two ultrasonic converters A, B, which are diametrically opposed at a distance L from each other. A fluid 1 flows in pipeline 3 with a velocity v in the direction of arrow 2. Measurement path L is tilted relative to flow direction 2 at an angle δ. While a measurement is being carried out, ultrasonic converters A, B send ultrasonic pulses to each other. The signals are decelerated or accelerated, depending on the direction of the flow. The transit times of the ultrasonic signals are a measure of the flow rate to be determined.

FIG. 2 shows a greatly simplified schematic depiction of electrical evaluation circuit 4. The two ultrasonic converters A, B are connected with control and evaluation electronics 4 and are activated by an oscillator with a specified clock frequency 8 (a square-wave signal in this case). Ultrasonic signals 15 generated as a result (only envelope 16 of ultrasonic signals 15 is shown in the figure) travel along measurement path L and are detected by the other ultrasonic converter A, B. Transit time $t_{12}$ or $t_{21}$ of signals 15 is measured.

Various methods for determining the transit time of ultrasonic signals are known from the related art. According to a first type of method, the instant when an ultrasonic signal is received is determined unequivocally and exactly. The first zero crossing of the ultrasonic signal that occurs after the signal amplitude has been exceeded a specified threshold value is the "reception time" of the signal. As an alternative, e.g., the instant at which the maximum amplitude occurs, or the instant at which the centroid of the envelope of the ultrasonic signal 15 occurs is used as the "reception time".

According to a second type of method for measuring transit time, the phase of an ultrasonic signal that has been received is determined with respect to a reference timing signal. It is known, for example, to determine the phase angle (Δφ) of an ultrasonic signal relative to a reference timing signal using a quadrature demodulation scheme, to calculate the total transit time of the ultrasonic signal based on the phase angle (Δφ), and to calculate a remainder (r(t)), which is a whole-number multiple of 2π. The ultrasonic signal is inverted in a segmented manner using a demodulation signal and a phase-shifted demodulation signal. The signals, which have been inverted in a segmented manner, are then preferably filtered or integrated, and the phase angle (Δφ) is determined using a trigonometric calculation. In this evaluation method, the unambiguous range of the calculated phases is equal to the reciprocal of the modulation frequency. The latter is determined by the ultrasonic frequency and/or the properties of the ultrasonic converter, however. This therefore typically results in a relatively small unambiguous range. For signals with a frequency of, e.g., 200 kHz, an unambiguous range of only 5 µs results. Determining the remainder (n*2π) is often a very complex procedure.

SUMMARY OF THE INVENTION

The object of the present invention, therefore, is to increase the unambiguous range of the phase and transit time measurement of ultrasonic signals.

In keeping with these objects and with others which will become apparent hereinafter, one feature of the present invention resides, briefly stated, in an ultrasonic flow sensor, comprising at least one ultrasonic converter for ultrasonic signals selected from the group consisting of an ultrasonic converter for transmitting ultrasonic signals an ultrasonic converter for receiving ultrasonic signals, and an ultrasonic converter for transmitting and receiving ultrasonic signals; an excitation unit connected with said ultrasonic converter; an evaluation unit ascertaining a phase shift of a received ultrasonic signal relative to a parameter selected from the group consisting of a reference signal and a reference value, said evaluating unit including a plurality of quadrature demodulators which operate with different demodulation frequencies and each ascertain phase information about the ultrasonic signal that was received, and which includes a vernier unit that ascertains based on associated phase angles, a phase shift to be determined or a quantity proportional thereto.

Another feature of the present invention resides, briefly stated, in a method for determining a transit time of an ultrasonic signal that was launched into a measurement path by an ultrasonic converter, comprising the steps of ascertaining a phase shift of the ultrasonic signal relative to a reference signal as a measure of a transient time; digitizing the ultrasonic signal received by a converter and supplying to a plurality of quadrature demodulators; operating each of the quadrature demodulators with a demodulation signal of a different frequency; ascertaining by each of the demodulators a phase information about the ultrasonic signal that was received; and based on a specific phase information and using a vernier method, ascertaining a phase angle or a quantity proportional thereto.

A further aspect of the present invention is to direct an ultrasonic signal that has been received to several parallel-connected quadrature demodulators that operate with different demodulation frequencies and each ascertain a piece of phase information about the ultrasonic signal that was received, and to direct the individual pieces of phase information to a vernier unit, which uses the information to calculate the phase angle (Δφ) of the ultrasonic signal with a larger unambiguous range. A zero phase of all demodulation frequencies is preferably used as the reference value for the phase determination. The advantage of determining several pieces of phase information from an ultrasonic signal and performing the evaluation using a vernier method is that the phase angle of the ultrasonic signal has a substantially larger unambiguous range than do known methods. As a result, an unambiguous range of, e.g., 150 μs or more may be attained.

The inventive evaluation unit preferably includes three or more quadrature demodulators. In principle, the quality of the measurement may be improved by using a larger number of quadrature demodulators. This also results in higher costs, however.

Within the framework of the quadrature demodulation, the ultrasonic signal is multiplied by the particular demodulation frequency and a demodulation signal that has been phase-shifted by 90°. The resultant signal corresponds to the real or imaginary part of the phase angle to be determined. A sinc filter is preferably located downstream of each of the quadrature demodulators. The sinc filters suppress the high-frequency interfering component of the real part and the imaginary part, e.g., noise.

When three quadrature demodulators are used, one of the demodulation frequencies is preferably equal to the oscillator frequency or the resonant frequency of the ultrasonic signal, a second demodulation frequency is less than the resonant frequency, and a third demodulation frequency is greater than the resonant frequency. The individual demodulation frequencies are preferably chosen depending on the band width of the ultrasonic signals, the sampling frequency of an analog/digital converter, and the error tolerance of the vernier unit.

The ultrasonic signals that are received are preferably digitized using an analog/digital converter located at the input of the quadrature demodulators.

The sampling frequency of the analog/digital converter is preferably divisible by the whole number, 4-fold multiple of all demodulation frequencies used. The error tolerance of the vernier method may be optimized via this selection of demodulation frequencies.

A first unit is preferably provided in each of the quadrature demodulators, by way of which the received, digitized ultrasonic signal is modulated with a demodulation signal. A second unit is also provided, at which the received ultrasonic signal is modulated with a demodulation signal that has been phase-shifted by 90°.

When the sampling frequency of the A/D converter does not correspond exactly to the condition described above, i.e., when the quotient of the sampling frequency and the demodulation frequency is, e.g., a whole number multiple of two, a phase error may occur with the resultant signal. This phase error ($\Delta$) may be eliminated using a simple phase correction. In this case, the evaluation unit includes optional electronics for phase correction. The phase filter may then be easily calculated out of the filtered signal. The unit for phase correction is preferably realized as an integrated circuit.

A CORDIC unit is preferably provided downstream of the quadrature demodulator or the unit for phase correction, if it is provided. The CORDIC unit preferably performs an arctangent calculation and calculates the specific phase angles based on the phase information supplied to it. The unambiguous range of the phase angles are the reciprocals of the demodulation frequencies (0-2 pi). The specific phase angles are the input quantities for the vernier unit, which uses this information to calculate the phase shift of the ultrasonic signal.

Highly diverse types of vernier methods used for signal evaluation are known from the related art. A vernier method based on linear maps is preferably used within the framework of the present invention. This is advantageous compared with the other known vernier methods because of its higher error tolerance and higher robustness in particular. With the vernier method based on linear maps, a weighted mean of several phase angles is calculated. In parallel therewith, an angular range-dependent constant is ascertained with the aid of several linear maps and a quantization. The measured quantity that is sought, i.e., the phase angle or transit time of the ultrasonic signal are then preferably calculated by addition modulo $2^n$ of these values.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
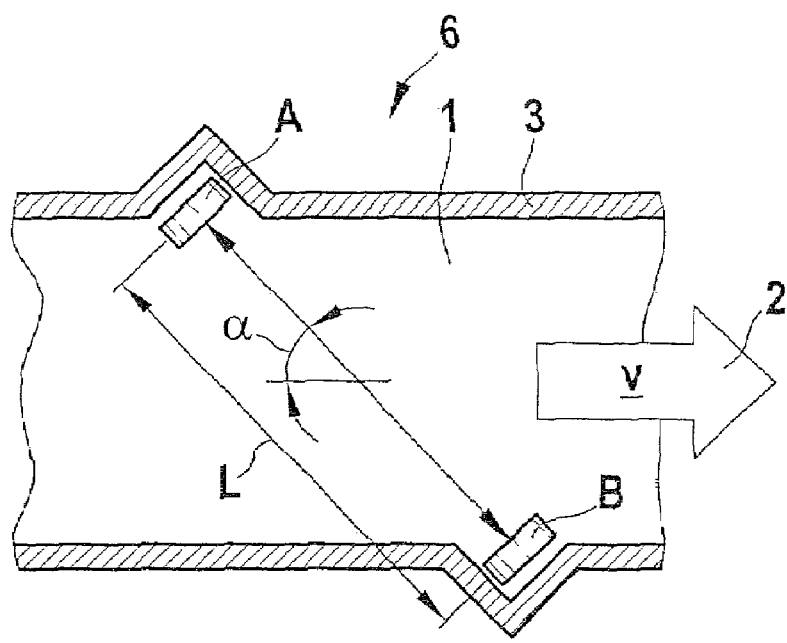
FIG. 1 shows an ultrasonic flow sensor with two ultrasonic converters according to the related art.
Figure 2:
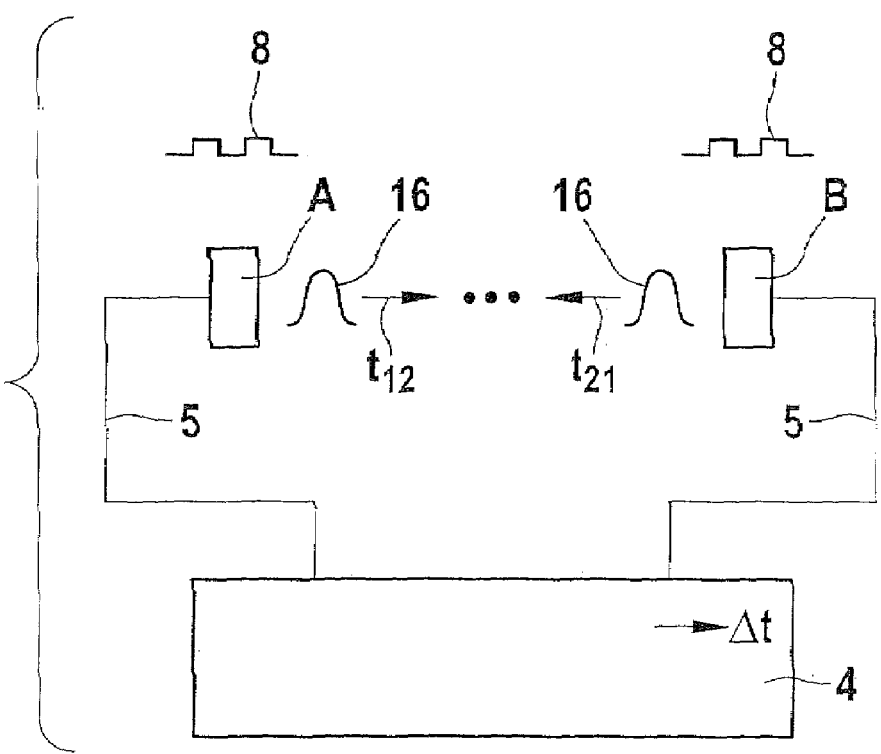
FIG. 2 shows an ultrasonic flow sensor with associated control and evaluation electronics.
Figure 3:
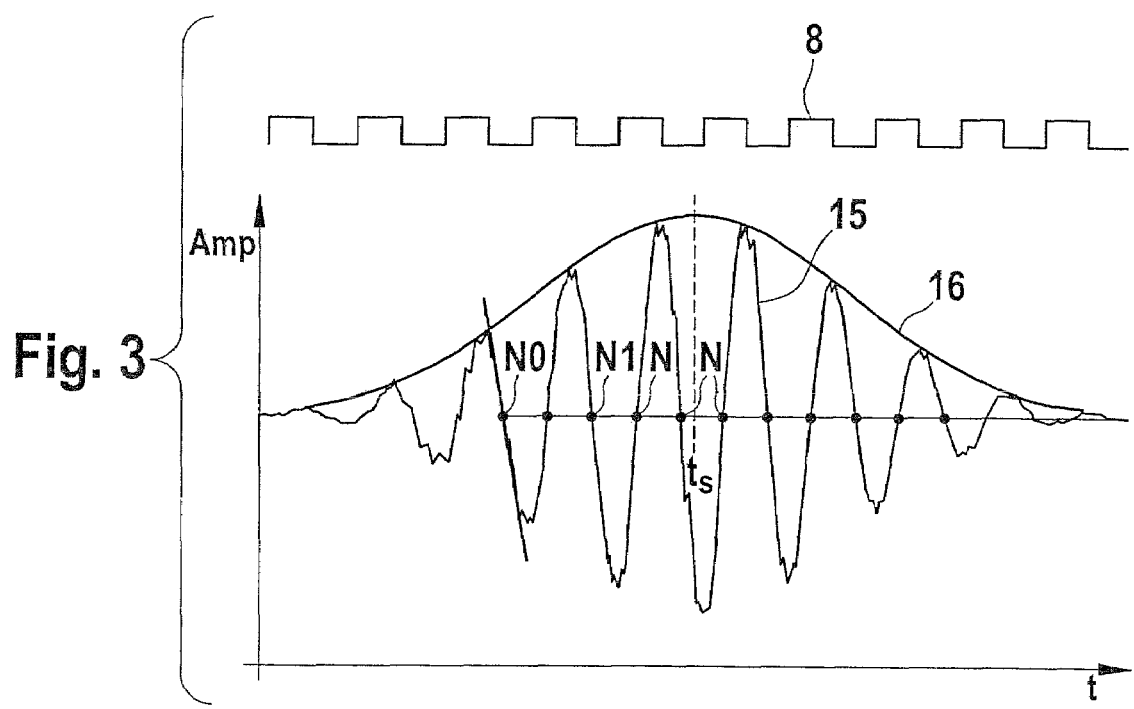
FIG. 3 shows the graph of a single ultrasonic signal, and its envelope.
Figure 4:
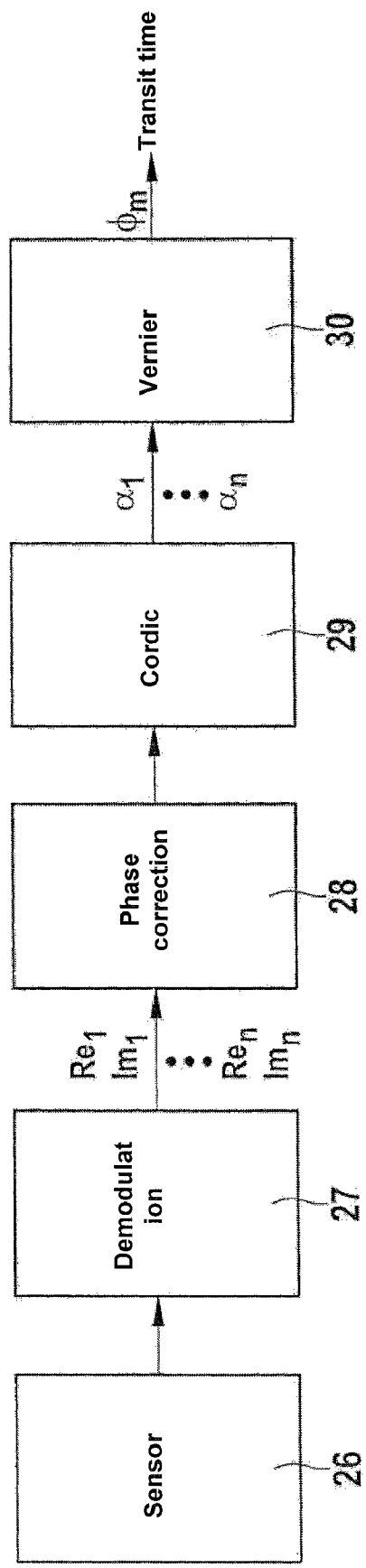
FIG. 4 is a block diagram of an ultrasonic flow sensor with evaluation electronics.

FIGS. 1 through 3 are explained in the introduction to the description,

FIG. 4 shows a schematic overview of a system for measuring the phase and/or transit time of an ultrasonic signal 15. The system includes (from left to right) a sensor 26, such as a converter A or B, a demodulator unit 27 with several quadrature demodulators (see FIG. 5), an optional unit 28 for phase correction of signals delivered by demodulator unit 27, a CORDIC algorithm, which performs an arctangent calculation, and a vernier unit 30, which calculates phase angle φ and/or transit time t of ultrasonic signal 15 based on the individual phase angles $\alpha_1$-$\alpha_n$.

Figure 5:
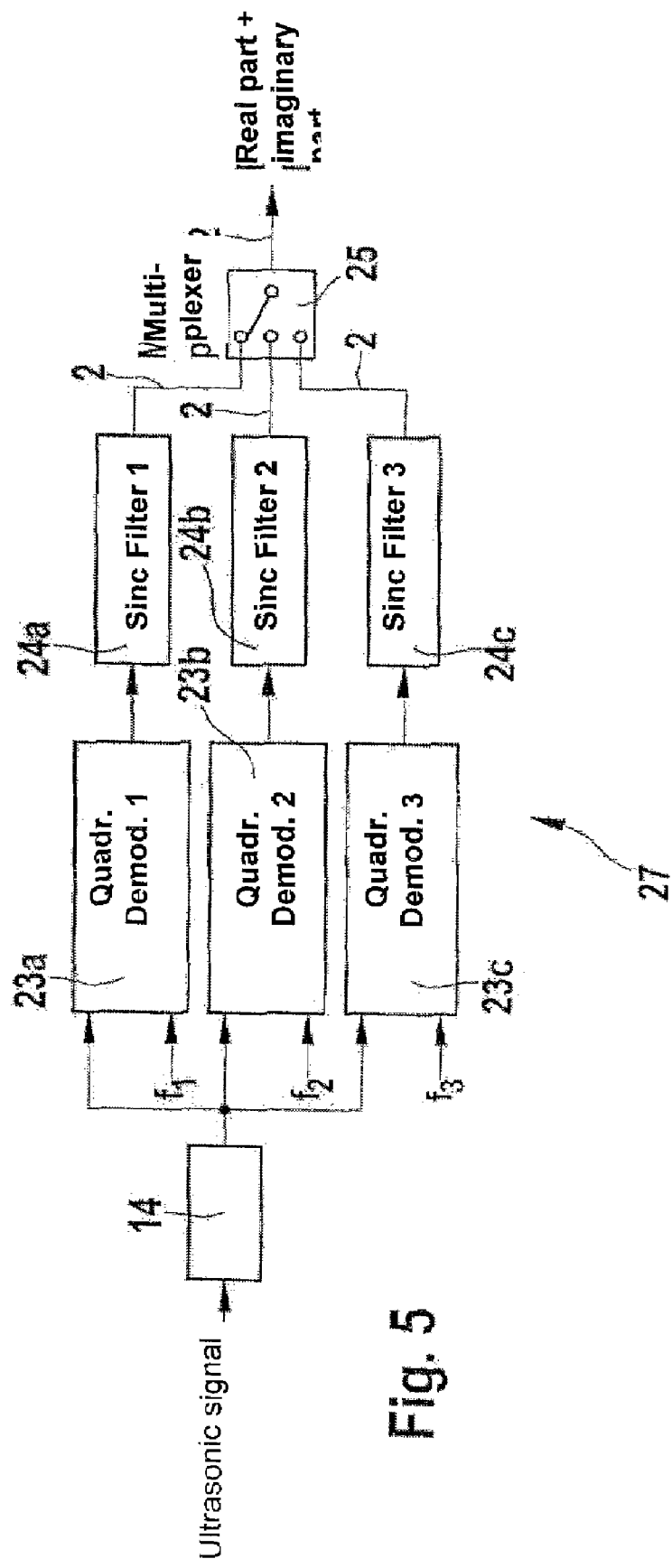
FIG. 5 is a schematicized depiction of the design of a quadrature demodulator unit with several quadrature demodulators.

FIG. 5 shows the demodulator unit 27 of FIG. 4 in detail. Demodulator unit 27 includes an A/D converter 14, with which ultrasonic signal 15 that was received is digitized, and a plurality of parallel-connected quadrature demodulators 23a-23c, which process the digitized signal. The function of the quadrature demodulator is explained below in greater detail with reference to FIG. 6.

Figure 6:
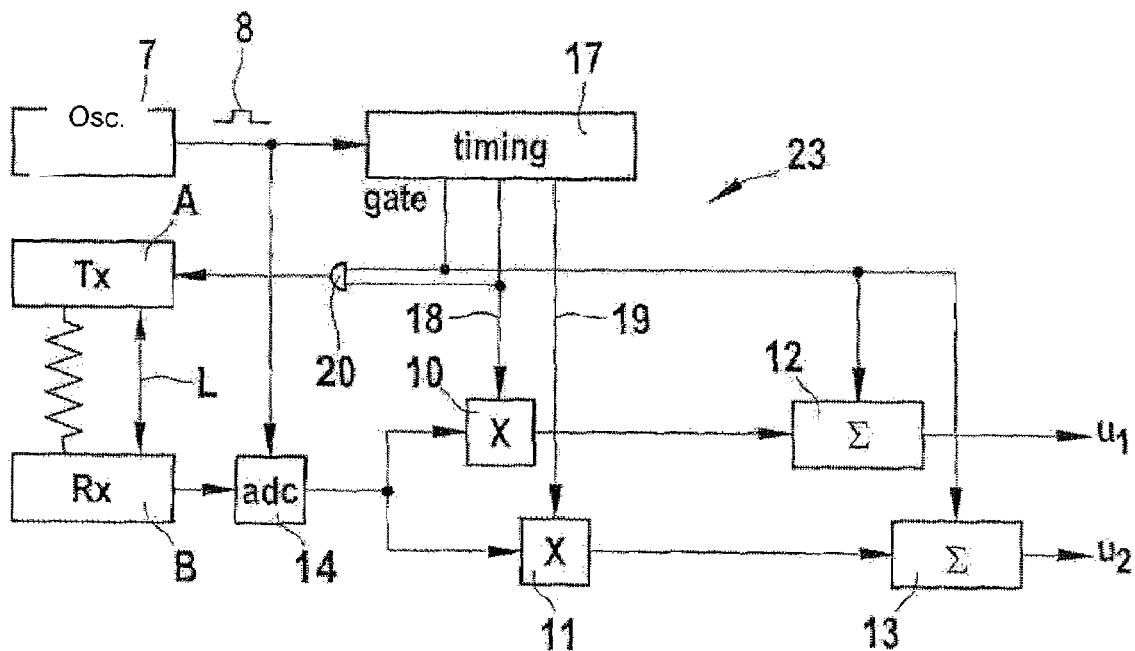
FIG. 6 is a schematic depiction of the design of a single quadrature demodulator.

FIG. 6 shows an ultrasonic flow sensor 6 with two ultrasonic converters A, B and control and evaluation electronics 4. Electronics 4 include an oscillator 7, which generates a timing signal 8, with which converters A, B are excited. (The ultrasonic signals could also be generated with the aid of a brief burst signal.) As a result, converters A, B generate ultrasonic signals 15, which are transmitted to the other converter, where they are detected. Based on transit time $t_{12}$ of a signal 15 in one direction, and transit time $t_{21}$ in the other direction, it is then possible to calculate the flow velocity v or mass flow of flowing medium 1. The transit time of the signals results from the phase of ultrasonic signals 15 with respect to a reference timing signal, e.g., timing signal 8 plus a whole-number multiple of an oscillation period.

To determine phase angle $\Delta\phi$, ultrasonic signal 15 that is received is first sent to an A/D converter 14, where it is digitized. The digitized received signal is divided into two signal paths. It is then modulated with a demodulation signal and a demodulation signal 19 shifted by pi/2(90°) phases, then it is forwarded unchanged or it is inverted. Digitized received signal 15 is forwarded unchanged, e.g., in the "high" state of demodulation signals 18, 19, and it is inverted in the "low" state. Demodulation signals 18, 19 are generated by a unit 17 from oscillator timing signal 8. Forwarding digitized received signal 15 unchanged or inverting it corresponds to multiplication by +1 and −1. The associated signal operation is therefore depicted using two multipliers 10 and 11. The signals, which are inverted in a segmented manner, are then sent to low-pass filters 12 and 13, which filter high-frequency interfering signals. Quantities u1 and u2 correspond to the real part and imaginary part, respectively, of phase angle $\Delta\phi$.

Figure 9:
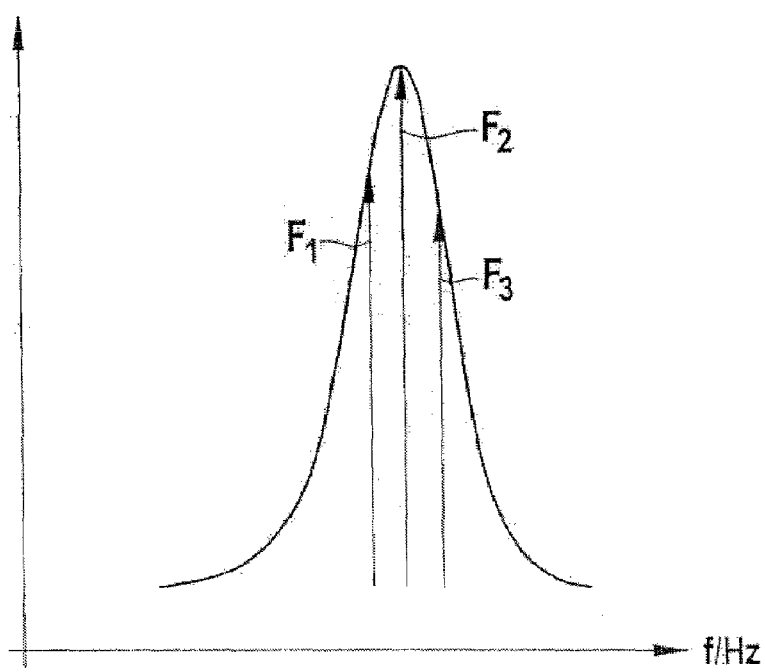
FIG. 9 shows the frequency response of an ultrasonic signal with demodulation frequencies.

Demodulation unit 27 in FIG. 5 includes three quadrature demodulators 23a-23c of this type that operate using different demodulation frequencies $f_1$-$f_3$. The demodulation frequencies have a certain relation to each other, which will be explained below with reference to FIG. 9. The signals, which have been inverted in a segmented manner (after multipliers 10 and 11), are sent to an associated sinc filter 24a-24c—which functions essentially as a low-pass filter—as shown in FIG. 5.

Figure 7:
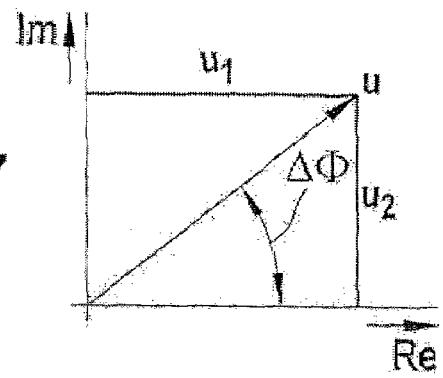
FIG. 7 is a schematic depiction of the phase measurement of an ultrasonic signal.

Sinc filters 24a-24c generate a signal $u_1$ and $u_2$ at their output. Values $u_1$ and $u_2$ are the components of a vector u, the angle of which in the coordinate system is phase angle $\Delta\phi$ or $\alpha$. FIG. 7a shows vector u and components $u_1$, $u_2$, and a phase angle $\alpha_1$ of ultrasonic signal 15 that was received.

The robustness and/or error tolerance of the evaluation method may be increased when the sampling frequency of A/D converter 14 is selected such that it is divisible by a whole-number, 4-fold value of all demodulation frequencies $f_1$-$f_3$ used. If this condition is not met exactly, a phase error $\Delta$ may occur, depending on the type of demodulation signal. This may be eliminated using a simple phase correction (see block 28 in FIG. 4), which is explained below. This results in greater freedoms in selecting the demodulation frequencies and, therefore, a greater error tolerance of the vernier method.

Demodulation signals 18, 19 may be described, e.g., using $\cos(\omega t)$ and $\sin(\omega t+\Delta)$. The signal modulated with demodulation frequency $f_1$-$f_3$ is therefore described as $\cos(\omega t+\phi)$ or $\sin(\omega t+\phi+\Delta)$. After sinc filters 24a-24c, therefore, $u_1=0.5\cdot\cos(\phi)$ and $u_2=\text{Im}=0.5\cdot\sin(\Delta-\phi)$.

These values may be phase-corrected using correction unit 28. With regard for the individual signals, therefore, $U_{1,cor}=\text{Re}=0.5\cdot\cos(\phi)$ and $U_{2cor}=\text{Im}=u_1\cdot\tan(\Delta)-\text{Im}\cdot 1/\cos(\Delta)=0.5\cdot\sin(\phi)$.

This correction may be realized with very little effort, e.g., in an integrated circuit.

A multiplexer 25 is provided at the output of demodulation unit 27. The serial output of individual pieces of phase information $u_1$, $u_2$ using a multiplexer 25 was selected in this case primarily for reasons of cost. As an alternative, subsequent units 29, etc., could also be designed with multiple parallel connections, of course.

Individual pieces of phase information $u_1$, $u_2$ from sinc filters 24a-24c are sent to a Cordic algorithm 29, which performs an arctan calculation. The result of this calculation is a phase angle $\alpha_1$-$\alpha_n$. Individual phase angles $\alpha_1$-$\alpha_n$ are sent to vernier unit 30.

Figure 8:
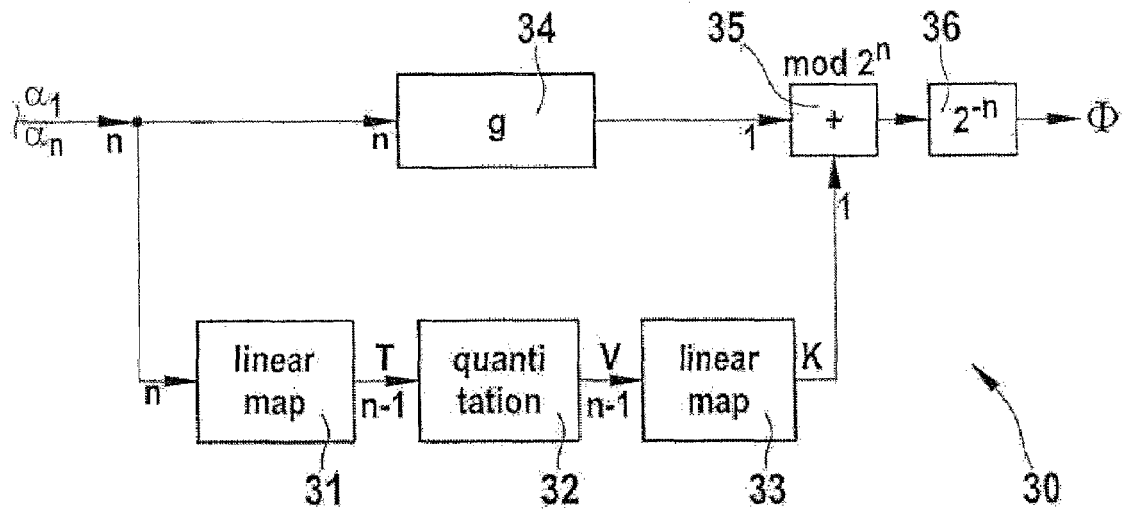
FIG. 8 is a schematic depiction of a vernier method using linear maps.

FIG. 8 is a more detailed depiction of the vernier method using linear maps. A weighted mean of phase angles $\alpha_1$-$\alpha_n$ is calculated in block 34. In parallel therewith, in the lower branch, a first linear map is formed (block 31), in the case of which an n-dimensional vector is initially mapped in a n−1-dimensional vector T. After quantization in module 32, a further linear map (block 33) is carried out, which generates a scalar. (If there are fewer than three quadrature demodulators, unit 33 serves as a weighting factor.) In block 35, the weighted mean and the scalar generated in the linear map are added modulo $2^n$. In block 36, the result is divided by $2^n$. This method ultimately delivers phase relation $\Delta\phi$ and phase angle $\phi$ of the ultrasonic signal that was received.

FIG. 8 shows the frequency response of an ultrasonic signal 15 that was received, with various demodulation frequencies $f_1$-$f_3$. Frequency $f_2$ corresponds to the resonant frequency of ultrasonic signal 15. Demodulation frequency $f_3$ is higher, and frequency $f_3$ is lower than resonant frequency $f_2$.

It will be understood that each of the elements described above, or two or more together, may also find a useful application in other types of constructions and methods differing from the type described above.

While the invention has been illustrated and described as embodied in an ultrasonic flow sensor with quadrature demodulation, it is not intended to be limited to the details shown, since various modifications and structural changes may be made without departing in any way from the spirit of the present invention.

Without further analysis, the foregoing will so fully reveal the gist of the present invention that others can, be applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An ultrasonic flow sensor, comprising at least one ultrasonic converter for ultrasonic signals selected from the group consisting of an ultrasonic converter for transmitting ultrasonic signals an ultrasonic converter for receiving ultrasonic signals, and an ultrasonic converter for transmitting and receiving ultrasonic signals; an excitation unit connected with said ultrasonic converter; an evaluation unit ascertaining a phase shift of a received ultrasonic signal relative to a parameter selected from the group consisting of a reference signal and a reference value, said evaluating unit including a plurality of quadrature demodulators which operate with different demodulation frequencies and each ascertain phase information about the ultrasonic signal that was received, and which includes a vernier unit that ascertains based on associated phase angles, a phase shift to be determined or a quantity proportional thereto.

2. An ultrasonic flow sensor as defined in claim 1, wherein said quadrature demodulators include at least three quadrature demodulators.

3. An ultrasonic flow sensor as defined in claim 1, wherein said quadrature demodulators are configured so that one of the demodulation frequencies is a resonant or an oscillator frequency, a second demodulator frequency is less than the resonant or the oscillator frequency and a third demodulation frequency is greater than the resonant or the oscillator frequency.

4. An ultrasonic flow sensor as defined in claim 1; and further comprising an analog/digital converter at an input of one of the quadrature demodulators, which digitizes the ultrasonic signal received by the ultrasonic converter.

5. An ultrasonic flow sensor as defined in claim 4, wherein said analog/digital converter is configured so that a sampling frequency of the analog/digital converter is divisible by four-fold or two-fold multiple of all demodulation frequencies used.

6. An ultrasonic flow sensor as defined in claim 1, wherein each of the quadrature demodulators includes a unit that modulates a received and digitized ultrasonic signal with a demodulation signal, and a unit that modulates the received and digitized ultrasonic signal with a demodulation signal that has been phase-shifted by 90°.

7. An ultrasonic flow sensor as defined in claim 1; and further comprising a unit for phase correction located downstream of the quadrature demodulators.

8. An ultrasonic flow sensor as defined in claim 1, wherein said vernier unit is configured so that it uses a vernier method based on linear maps.

9. An ultrasonic flow sensor as defined in claim 1; and further comprising a unit for calculating phase angles, which is configured to calculate a phase angle based on a phase information delivered by the quadrature demodulators.

10. An ultrasonic flow sensor as defined in claim 1, wherein the ultrasonic flow sensor is configured as a sensor for determining a flow velocity of a medium flowing through a pipeline.

11. A method for determining a transit time of an ultrasonic signal that was launched into a measurement path by an ultrasonic converter, comprising the steps of ascertaining a phase shift of the ultrasonic signal relative to a reference signal as a measure of a transient time; digitizing the ultrasonic signal received by a converter and supplying to a plurality of quadrature demodulators; operating each of the quadrature demodulators with a demodulation signal of a different frequency; ascertaining by each of the demodulators a phase information about the ultrasonic signal that was received; and based on a specific phase information and using a vernier method, ascertaining a phase angle or a quantity proportional thereto.

* * * * *